Patented Feb. 27, 1945

2,370,123

UNITED STATES PATENT OFFICE 2,370,123

DISSOLVING DRIED STARCH CONVERSION SOLIDS

Ben F. Buchanan, Leonia, N. J., assignor to American Maize-Products Company, a corporation of Maine No Drawing. Application April 23, 1942, Serial No. 440,267

4 Claims. (Cl. 99—141)

This invention relates to the dissolving of dried starch conversion syrup solids and particularly to a quick and convenient method of forming concentrated aqueous solutions of finely divided starch conversion syrup solids.

Starch conversion syrup solids in dried condition are extensively used in many industries including, for example, the manufacture of sherbet and ice cream. For such uses these solids possess certain decided advantages over starch conversion syrup. In dissolving the dried starch conversion syrup solids there has been some difficulty, however, due to the tendency of the material to collect into lumps or masses that dissolve slowly.

In order to overcome this difficulty in forming solutions quickly, it has been customary to add the solids to hot water, the general understanding being to the effect that the warmer the water the faster the starch conversion syrup solids dissolve.

I have now discovered that the starch conversion syrup solids may be dissolved more rapidly in cold water than in hot water provided the water is added slowly to the starch conversion syrup solids while the latter are being stirred so that large local excesses of water do not collect and persist in any part of the mixture.

The invention comprises this method of dissolving the starch conversion syrup solids by the addition of cold water to the solids while the whole is being stirred. The invention in its preferred embodiment comprises the formation in this manner of a concentrated aqueous solution, the forming of the solids into objectionable masses or lumps on mixing with water being thus avoided even when the solutions so made are of concentration as high as 90 parts or so of solids for 100 parts of total solution, solutions containing as much as 50% of solids being referred to herein as "concentrated."

As the solids to be dissolved, there are used dried starch conversion syrup solids of degree of conversion corresponding to a dextrose equivalent of approximately 20 to 70%. Such solids as ordinarily dissolve soften over the surface of the particles more rapidly than dissolved away. Also, the solids used are finely divided and suitably of such size of particles predominantly as to pass through a 20 mesh screen and preferably practically entirely through a 60 mesh screen. Particularly satisfactory results have been obtained when the solids are those obtained by spray drying corn starch conversion syrup, such particles in a typical screen test showing 1.2% retained on 150 mesh, 16.5% through 150 and on 200 mesh, and 82.3% finer than 200 mesh.

The water used should be at as low a temperature as feasible so long as the water is in liquid form. Water temperatures of 0° to 20° C. give excellent results when used in accordance with the present method, although temperatures of 20° to 30° C. are also allowable, and less satisfactory but still desirable results have been obtained with water temperatures ranging between 30° and 40° C. Contact of the said solids with the water in cold condition is continued until the solids dissolve.

As the temperature of the water used rises substantially above 40° C., there is objectionable lumping of the solids and delaying of the final desired solution of them.

It is necessary not only that the water as used be cold, but also that the water be added slowly to the solids to be dissolved. This is the opposite of the usual technique in which the solids are added to the whole amount of the water provided for effecting the solution. It is necessary also that the entire mass be stirred during the addition of the water, so that the water is kept well distributed throughout the entire mass, the softened surfaces of the particles are kept dissolved away, and large persistent local excesses of water in the mass are avoided at all times. Thus, the water should not be added so rapidly or the stirring be so slow that masses of free water of substantial extent appear between the particles of solids to be dissolved.

The more rapidly the water is added, the more rapid also must be the stirring. Conversely, the stirring may be relatively slow when the water is added in extremely small increments or at a very slow rate.

Thus, in forming a concentrated solution of spray dried corn starch conversion syrup in a 10 gallon sherbet can, the stirring may be effected by a manually operated paddle and the total water required may be added in a half minute or so, longer times being entirely satisfactory except for the general desire to make the solution as rapidly as feasible.

If, on the other hand, it is desired to dissolve a large batch of the solids, then it is necessary to agitate with a thoroughness and speed requiring mechanical agitation. Thus, a 1000 gallon batch of spray dried starch conversion syrup solids may be stirred with an agitator having a vertical shaft and horizontal arms moving at the rate of say 30 to 60 R. P. M. and having fingers that together or separately extend vertically throughout practically the entire batch. With such a large batch the time of adding the water may be 2 to 5 minutes or as much longer as desired, 3 minutes being ordinarily entirely adequate.

The present method is adapted particularly to the making of concentrated solutions that are difficult to form without the intermediate balling up or lumping together of starch conversion syrup solids when the usual hot water method of dissolving is used. Thus, I may make quickly solutions of uniformly dissolved starch conversion syrup solids that are so concentrated as to be of generally pasty consistency. Solutions so made are easily diluted subsequently by the addition of water and have a "shortness" that is not obtained by the evaporation of starch conversion liquor to the same proportion of water during the original manufacture of starch conversion syrup, the "shortness" being indicated by relatively low viscosity as compared to that of the original syrup of equal density.

Proportions of water that are particularly satisfactory in my process are approximately 10 to 25 parts of water to 100 of the total solution. Larger amounts of the cold water may be used and decided advantages over dissolving in hot water are obtained when the proportion of water used is approximately equal to or greater than the weight of solids to be dissolved.

When the cold water is added as described to the stirred mass of starch conversion syrup solids, there is prevented the formation of the particles that result when hot water is used, namely, small or large lumps of the starch conversion syrup solids having gummy crusts which promote adherence. In my process the water is distributed practically uniformly throughout the whole mass and is swept away from any individual particle on which the water may temporarily have been present in a relatively large excess. Once the water is distributed between the various particles, then each particle dissolves in approximately the desired proportion of water without first agglomerating into a larger mass with other particles. In this method, the proportion of water in any substantial part of the mixture is never substantially greater than that which obtains in the final desired solution. This is a distinction from the condition that prevails when the solids are added to the water, the proportion of the water initially being infinite and being subsequently lowered as solids dissolve in the solution first formed.

As the starch conversion syrup solids there may be used those obtained from the conversion of starch from corn, potato, rice, tapioca, or like starch material, the syrup first made in conventional manner being converted to solidified form in any suitable manner, as for example, by spray drying the concentrated syrup of very low moisture content or flowing the syrup into pans in which the syrup freezes. If the process of solidification selected is the latter one or any other that gives a massive product, then the solidified product is finely ground before being subjected to dissolving in cold water as described. When the spray drying method is used, the particles obtained are sufficiently fine without additional grinding and are particularly adapted by their over-all lightness, hollow structure, and ease of being stirred for use in the present method.

In a modification of the invention the process may be used to increase the concentration of a syrup. It is difficult, for example, to transfer through pumps and pipe lines syrups of concentrations as high as desired in certain industries, when the syrups are shipped in tank cars or other large containers and exposed to low winter temperatures. Thus, it is desirable in some instances to use syrups of degree of density as high as 45° Bé., syrups that at winter temperatures are extremely viscous.

I have now found that I can use syrups that are not so highly concentrated as to be difficult to handle and fortify them by dissolving starch conversion syrup solids to give the desired concentration before use of the material.

To effect this fortification without experiencing difficulties in rapidly dissolving the dried starch conversion syrup solids in the syrup, I add the syrup in cold condition slowly to the dried solids while vigorously stirring the latter. In other words, I substitute the cold water that is used in the preferred embodiment of the invention by the cold syrup in this modification.

In a typical example of the fortification of a syrup, I have weighed into a container the requisite amount of spray dried corn syrup solids and then flowed slowly upon the solids a 43° Baumé corn syrup at a temperature of approximately 20° C., temperatures of the syrup ranging from just above the freezing point up to 40° C. being satisfactory. In this way there has been made a syrup of density 45° Baumé that is ready for use for purposes requiring a high density syrup, as in making certain confectionery products.

As an alternative for the fortification of the syrup as described, a sugar syrup, say sucrose, corn, or partially inverted sugar syrup, is mixed continuously with dried starch conversion syrup solids in finely divided form until the solids are thoroughly distributed throughout the syrup, the whole mass being maintained in substantially unheated condition until the solids are so distributed. In such manner there is obtained quick solution of the solids and the desired fortification of the syrup.

The particles of dried starch conversion syrup solids to be used should be predominantly void-defining or in the form roughly of minute hollow spheres such as obtained by spray drying, the lightness thus caused facilitating mechanical stirring of the mass and decreasing the rate of settling in water and the thinness of walls of the particles promoting solution in water.

It will be understood that certain details given are for the purpose of illustration and not restriction and that variations within the spirit of the invention are intended to be included within the scope of the appended claims.

What I claim is:

1. In dissolving dried finely divided starch conversion syrup solids to form a concentrated aqueous solution, the method which comprises flowing cold liquid water slowly upon the whole amount of syrup solids to be dissolved until all the water required for the dissolving has been introduced, while stirring the said solids continuously so as to distribute the water as added over the solids and thus avoid persistent large local excesses of water, and continuing the contact of the said solids with the water in cold condition until the solids are dissolved, the cold water at no time being present in any substantial part of the mixture in a higher proportion to the solids than in the final desired solution of the solids, serving when distributed as described to dissolve the said solids more rapidly than hot water dissolves them, and preventing the objectionable agglomeration of the said solids into masses of slow rate of solution.

2. The method described in claim 1, the said solids being used in the form of particles practically entirely of size to pass through a 60-mesh screen and having a reducing sugars content calculated as dextrose of 20% to 70%.

3. The method described in claim 1, the water as added to the said solids being at a temperature not substantially above 40° C. and the said solids being in the form of minute void-defining thin-walled particles.

4. The method described in claim 1, the water flowed upon the said solids being in the proportion of about 10 to 25 parts for 100 parts of combined weight of water and said solids.

BEN F. BUCHANAN.